US012802122B2

(12) United States Patent
Su et al.

(10) Patent No.: US 12,802,122 B2
(45) Date of Patent: *Nov. 17, 2026

(54) DIGITAL WARDROBE

(71) Applicant: eBay Inc., San Jose, CA (US)

(72) Inventors: Jonathan Su, San Jose, CA (US); Jatin Chhugani, Santa Clara, CA (US); Mihir Naware, Redwood City, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/811,240

(22) Filed: Aug. 21, 2024

(65) Prior Publication Data

US 2024/0412278 A1 Dec. 12, 2024

Related U.S. Application Data

(63) Continuation of application No. 18/106,810, filed on Feb. 7, 2023, now Pat. No. 12,125,095, which is a (Continued)

(51) Int. Cl.
*G06Q 30/00* (2023.01)
*G06Q 30/0601* (2023.01)

(52) U.S. Cl.
CPC ................................ *G06Q 30/0643* (2013.01)

(58) Field of Classification Search
CPC ........... G06Q 30/0601; G06Q 30/0623; G06Q 30/0641; G06Q 30/0643
See application file for complete search history.

(56) References Cited

U.S. PATENT DOCUMENTS

| | | | |
|---|---|---|---|
| 5,255,352 | A | 10/1993 | Falk |
| 5,495,568 | A | 2/1996 | Beavin |

(Continued)

FOREIGN PATENT DOCUMENTS

| | | | |
|---|---|---|---|
| CN | 102842089 | A | 12/2012 |
| CN | 103455501 | A | 12/2013 |

(Continued)

OTHER PUBLICATIONS

Jevšnik, Simona, et al. "Evaluation of a garment fit model using AHP." Fibres & Textiles in Eastern Europe 2 (110 (2015): 116-122. (Year: 2015).*

(Continued)

*Primary Examiner* — Christopher B Seibert

(74) *Attorney, Agent, or Firm* — Shook Hardy & Bacon L.L.P.

(57) ABSTRACT

Techniques for generating a digital wardrobe are presented herein. A transceiver can be configured to receive a request having a garment identifier and a user identifier. Additionally, an access module can be configured to access a first garment model, access a body model of the user corresponding to the user identifier, and access a second garment model corresponding to the user identifier. Furthermore, a processor can be configured by a garment simulation module to position the body model inside the first garment model and the second garment model, and calculate simulated forces based on the positioning. Moreover, a rendering module can be configured to generate an image of the garment models draped on the body model based on the calculated simulated forces. Subsequently, a display module can be configured to cause presentation of the generated image on a display of a device.

20 Claims, 9 Drawing Sheets

Related U.S. Application Data continuation of application No. 17/206,931, filed on Mar. 19, 2021, now Pat. No. 11,599,937, which is a continuation of application No. 16/233,908, filed on Dec. 27, 2018, now Pat. No. 10,977,721, which is a continuation of application No. 14/556,677, filed on Dec. 1, 2014, now Pat. No. 10,204,375.

(56) References Cited

U.S. PATENT DOCUMENTS 5,930,769 A * 7/1999 Rose ...................... G06Q 30/06 705/26.81
6,175,655 B1 1/2001 George, III et al.
6,201,546 B1 * 3/2001 Bodor ....................... G06T 7/97 345/620
6,310,627 B1 10/2001 Sakaguchi
6,344,853 B1 * 2/2002 Knight ................... G06Q 30/02 345/629
6,415,199 B1 7/2002 Liebermann
6,546,309 B1 * 4/2003 Gazzuolo ................ G06T 17/20 702/167
6,643,385 B1 11/2003 Bravomalo
6,813,838 B2 11/2004 McCormick
7,242,999 B2 7/2007 Wang
7,308,332 B2 12/2007 Toshiba
7,328,119 B1 2/2008 Pryor et al.
7,354,411 B2 4/2008 Perry et al.
7,398,133 B2 7/2008 Wannier et al.
7,548,794 B2 6/2009 Vandergriff et al.
7,714,912 B2 5/2010 Faisman et al.
8,090,465 B2 1/2012 Zeng
8,269,778 B1 9/2012 Baraff et al.
8,359,247 B2 1/2013 Vock
8,525,828 B1 9/2013 Bates
8,659,596 B2 2/2014 Corazza et al.
8,704,832 B2 4/2014 Taylor et al.
8,711,175 B2 4/2014 Aarabi
8,736,606 B2 5/2014 Ramalingam
8,749,556 B2 6/2014 de Aguiar et al.
8,797,328 B2 8/2014 Corazza et al.
8,970,585 B2 3/2015 Weaver
9,098,873 B2 8/2015 Geisner et al.
9,355,419 B2 * 5/2016 Yalamanchi ........ G06F 12/0646
9,378,593 B2 6/2016 Chhugani et al.
9,460,342 B1 10/2016 Freund et al.
9,691,161 B1 6/2017 Yalniz et al.
9,727,983 B2 * 8/2017 Dorner .................... G06T 11/10
9,824,152 B1 * 11/2017 Feller .................. G06F 16/9535
9,916,345 B1 * 3/2018 Makadia ................. G06F 16/58
10,046,234 B2 * 8/2018 Perdigón ............... A63F 13/212
10,204,375 B2 2/2019 Su et al.
10,977,721 B2 4/2021 Su et al.
2001/0026272 A1 * 10/2001 Feld ....................... A41H 3/007 345/585
2002/0004763 A1 1/2002 Lam
2002/0126132 A1 * 9/2002 Karatassos .............. G06T 19/00 345/586
2002/0126328 A1 9/2002 Lehmeier et al.
2003/0076318 A1 * 4/2003 Shaw-Weeks ........... A41H 1/00 345/419
2003/0101105 A1 5/2003 Vock
2003/0139896 A1 7/2003 Dietz et al.
2004/0049309 A1 3/2004 Garden et al.
2004/0083142 A1 4/2004 Kozzinn
2006/0020482 A1 1/2006 Coulter
2006/0202986 A1 9/2006 Okada et al.
2007/0005174 A1 * 1/2007 Thomas ................. G06Q 30/02 700/132
2007/0027564 A1 * 2/2007 Walters .................. G06Q 10/06 703/1
2007/0124215 A1 5/2007 Simmons, Jr.
2007/0130020 A1 * 6/2007 Paolini ............... G06Q 30/0631 705/26.62
2007/0182736 A1 8/2007 Weaver
2007/0250203 A1 10/2007 Yamamoto et al.
2008/0140650 A1 6/2008 Stackpole
2008/0163344 A1 * 7/2008 Yang ................. G06Q 30/0201 705/7.29
2008/0201228 A1 8/2008 Gillet et al.
2008/0221403 A1 9/2008 Fernandez
2008/0255920 A1 * 10/2008 Vandergriff ........ G06Q 30/0601 705/26.1
2008/0312765 A1 12/2008 Gardiner et al.
2009/0002224 A1 1/2009 Khatib et al.
2009/0018803 A1 1/2009 Ko et al.
2009/0115777 A1 * 5/2009 Reyers Moreno ...... G06T 17/30 348/121
2009/0144639 A1 6/2009 Nims et al.
2009/0276300 A1 11/2009 Shaw et al.
2010/0030578 A1 2/2010 Siddique et al.
2010/0049633 A1 2/2010 Wannier et al.
2010/0061596 A1 * 3/2010 Mostafavi ............... G06T 7/248 382/209
2010/0063419 A1 * 3/2010 Mostafavi ............ A61B 5/1135 600/587
2010/0082360 A1 4/2010 Chien et al.
2010/0097395 A1 4/2010 Chang et al.
2010/0191770 A1 7/2010 Cho et al.
2010/0280920 A1 11/2010 Scott et al.
2010/0305909 A1 12/2010 Wolper et al.
2010/0306082 A1 * 12/2010 Wolper ............. G06Q 30/0603 345/619
2010/0313141 A1 12/2010 Yu et al.
2011/0022372 A1 1/2011 Isogai et al.
2011/0022965 A1 1/2011 Lawrence et al.
2011/0063208 A1 3/2011 Van Den Eerenbeemd et al.
2011/0184831 A1 7/2011 Dalgleish
2011/0191070 A1 8/2011 Ramalingam
2011/0231278 A1 9/2011 Fries
2011/0292034 A1 12/2011 Corazza et al.
2011/0298897 A1 12/2011 Sareen et al.
2012/0022978 A1 * 1/2012 Manea ............... G06Q 30/0603 705/27.2
2012/0030062 A1 2/2012 Stauffer et al.
2012/0054059 A1 3/2012 Rele
2012/0078145 A1 3/2012 Malhi et al.
2012/0095589 A1 4/2012 Vapnik
2012/0166377 A1 * 6/2012 Sathish .................. G06Q 10/00 706/47
2012/0233003 A1 9/2012 Calman et al.
2012/0281019 A1 11/2012 Tamstorf et al.
2012/0299912 A1 11/2012 Kapur et al.
2012/0308087 A1 12/2012 Chao et al.
2012/0309520 A1 12/2012 Evertt et al.
2012/0310791 A1 12/2012 Weerasinghe
2013/0024301 A1 1/2013 Mikan et al.
2013/0071584 A1 3/2013 Bell
2013/0073545 A1 * 3/2013 Jain ..................... G06F 16/9535 707/723
2013/0108121 A1 5/2013 de Jong
2013/0110482 A1 5/2013 Ellens et al.
2013/0173226 A1 7/2013 Reed et al.
2013/0215116 A1 8/2013 Siddique et al.
2013/0258045 A1 10/2013 Wojciech
2013/0268399 A1 10/2013 Lu et al.
2013/0317944 A1 11/2013 Huang et al.
2014/0035913 A1 2/2014 Higgins et al.
2014/0114620 A1 * 4/2014 Grinspun ............... A41H 3/007 703/1
2014/0114884 A1 4/2014 Daway
2014/0115001 A1 * 4/2014 Arroyo ............... G06F 16/9032 707/772
2014/0129390 A1 5/2014 Mauge et al.
2014/0164902 A1 6/2014 Sager
2014/0168217 A1 * 6/2014 Kim ................... G06Q 30/0643 345/420
2014/0176565 A1 6/2014 Adeyoola et al.
2014/0180864 A1 6/2014 Orlov et al.
2014/0257993 A1 9/2014 Paolini
2014/0267717 A1 9/2014 Pitzer et al.
2014/0270540 A1 9/2014 Spector et al.
2014/0279200 A1 9/2014 Hosein et al.

(56) References Cited

U.S. PATENT DOCUMENTS

| | | | | |
|---|---|---|---|---|
| 2014/0279289 | A1 | 9/2014 | Steermann | |
| 2014/0313192 | A1 | 10/2014 | Corazza et al. | |
| 2014/0324626 | A1* | 10/2014 | Klink | G06Q 30/0631 705/26.8 |
| 2014/0333614 | A1 | 11/2014 | Black et al. | |
| 2014/0368499 | A1* | 12/2014 | Kaur | G06T 19/20 345/420 |
| 2015/0130795 | A1 | 5/2015 | Chhugani et al. | |
| 2015/0134302 | A1 | 5/2015 | Chhugani et al. | |
| 2015/0134493 | A1 | 5/2015 | Su et al. | |
| 2015/0134494 | A1 | 5/2015 | Su et al. | |
| 2015/0134495 | A1 | 5/2015 | Naware et al. | |
| 2015/0134496 | A1 | 5/2015 | Grinblat et al. | |
| 2015/0154691 | A1* | 6/2015 | Curry | G06Q 30/0631 705/27.2 |
| 2015/0186977 | A1 | 7/2015 | Leonard et al. | |
| 2015/0366504 | A1 | 12/2015 | Connor | |
| 2016/0035061 | A1 | 2/2016 | Gadre | |
| 2016/0063551 | A1* | 3/2016 | Yankovich | G06Q 30/0256 705/14.54 |
| 2016/0063588 | A1 | 3/2016 | Gadre et al. | |
| 2016/0088284 | A1 | 3/2016 | Sareen et al. | |
| 2016/0092956 | A1 | 3/2016 | Su et al. | |
| 2016/0117749 | A1 | 4/2016 | Desmarais et al. | |
| 2016/0155186 | A1 | 6/2016 | Su et al. | |
| 2016/0165988 | A1 | 6/2016 | Glasgow et al. | |
| 2016/0165989 | A1 | 6/2016 | Glasgow et al. | |
| 2016/0171583 | A1 | 6/2016 | Glasgow et al. | |
| 2016/0180447 | A1 | 6/2016 | Kamalie et al. | |
| 2016/0180449 | A1 | 6/2016 | Naware et al. | |
| 2016/0180562 | A1 | 6/2016 | Naware et al. | |
| 2016/0210602 | A1 | 7/2016 | Siddique et al. | |
| 2016/0217157 | A1* | 7/2016 | Shih | G06F 16/5838 |
| 2016/0247017 | A1 | 8/2016 | Sareen et al. | |
| 2016/0249699 | A1 | 9/2016 | Inghirami | |
| 2016/0284017 | A1* | 9/2016 | Almog | G06T 7/60 |
| 2016/0292779 | A1 | 10/2016 | Rose | |
| 2016/0292915 | A1 | 10/2016 | Chhugani et al. | |
| 2017/0004567 | A1* | 1/2017 | Dutt | G06Q 30/0643 |
| 2017/0103135 | A1* | 4/2017 | Bayer | G06F 16/24578 |
| 2017/0316617 | A1* | 11/2017 | Jeong | G06T 7/74 |
| 2017/0372398 | A1* | 12/2017 | Kopru | G06Q 30/0627 |
| 2018/0130113 | A1* | 5/2018 | Ruvini | G06Q 30/0603 |
| 2018/0211304 | A1* | 7/2018 | Baxter | G06Q 30/0625 |
| 2018/0263324 | A1* | 9/2018 | Anderson | A41H 3/007 |
| 2018/0276295 | A1* | 9/2018 | Abou Mahmoud | G06F 16/334 |
| 2019/0050427 | A1* | 2/2019 | Wiesel | G06T 19/00 |
| 2019/0122083 | A1* | 4/2019 | Di | G06Q 30/0613 |
| 2019/0244281 | A1 | 8/2019 | Su et al. | |
| 2019/0384901 | A1* | 12/2019 | Osborn | G06N 3/08 |
| 2021/0241364 | A1 | 8/2021 | Su et al. | |
| 2023/0186378 | A1 | 6/2023 | Su et al. | |

FOREIGN PATENT DOCUMENTS

| | | | |
|---|---|---|---|
| CN | 103605832 | A | 2/2014 |
| DE | 19922150 | A1 | 11/2000 |
| EP | 2091015 | A1 | 8/2009 |
| EP | 2187325 | A1 | 5/2010 |
| WO | WO-2010060113 | A1 | 5/2010 |
| WO | WO-2012110828 | A1 | 8/2012 |
| WO | WO-2013188908 | A1 | 12/2013 |
| WO | WO-2014182545 | A1 | 11/2014 |
| WO | WO-2016106193 | A1 | 6/2016 |
| WO | WO-2016106216 | A2 | 6/2016 |
| WO | WO-2016106216 | A3 | 6/2016 |
| WO | WO-2016160776 | A1 | 10/2016 |

OTHER PUBLICATIONS

Baraff, David, and Andrew Witkin. "Large steps in cloth simulation." Proceedings of the 25th annual conference on Computer graphics and interactive techniques. 1998. (Year: 1998).*

"U.S. Appl. No. 13/722,818, Examiner Interview Summary mailed Feb. 20, 2015", 3 pgs.

"U.S. Appl. No. 13/722,818, Final Office Action mailed Apr. 15, 2015", 16 pgs.

"U.S. Appl. No. 13/722,818, Final Office Action mailed Jul. 11, 2016", 23 pgs.

"U.S. Appl. No. 13/722,818, Non Final Office Action mailed Mar. 24, 2014", 22 pgs.

"U.S. Appl. No. 13/722,818, Non Final Office Action mailed Sep. 12, 2014", 16 pgs.

"U.S. Appl. No. 13/722,818, Non Final Office Action mailed Dec. 17, 2015", 21 pgs.

"U.S. Appl. No. 13/722,818, Response filed Feb. 12, 2015 to Non Final Office Action mailed Sep. 9, 2014", 25 pgs.

"U.S. Appl. No. 13/722,818, Response filed Jun. 17, 16 to Non Final Office Action mailed Dec. 17, 2015", 17 pgs.

"U.S. Appl. No. 13/722,818, Response filed Aug. 25, 14 to Non Final Office Action mailed Mar. 24, 2014", 14 pgs.

"U.S. Appl. No. 13/722,818, Response filed Oct. 15, 2015 to Final Office Action mailed Apr. 15, 2015", 15 pgs.

"U.S. Appl. No. 14/270,244, Examiner Interview Summary mailed Apr. 6, 2017", 5 pgs.

"U.S. Appl. No. 14/270,244, Final Office Action mailed Jul. 14, 2017", 37 pgs.

"U.S. Appl. No. 14/270,244, Non Final Office Action mailed Jan. 12, 2017", 35 pgs.

"U.S. Appl. No. 14/270,244, Response filed Apr. 4, 2017 to Non Final Office Action mailed Jan. 12, 2017", 12 pgs.

"U.S. Appl. No. 14/449,120, Examiner Interview Summary mailed Apr. 21, 2017", 4 pgs.

"U.S. Appl. No. 14/449,120, Non Final Office Action mailed Feb. 8, 2017", 32 pgs.

"U.S. Appl. No. 14/474,003, Preliminary Amendment filed Oct. 3, 2014", 3 pgs.

"U.S. Appl. No. 14/530,636, Non Final Office Action mailed Nov. 5, 2015", 6 pgs.

"U.S. Appl. No. 14/530,636, Notice of Allowance mailed Mar. 28, 2016", 8 pgs.

"U.S. Appl. No. 14/530,636, Response filed Mar. 7, 2016 to Non Final Office Action mailed Nov. 5, 2015", 8 pgs.

"U.S. Appl. No. 14/556,677, Advisory Action mailed Jan. 10, 2018", 3 pgs.

"U.S. Appl. No. 14/556,677, Examiner Interview Summary mailed May 21, 2018", 3 pgs.

"U.S. Appl. No. 14/556,677, Examiner Interview Summary mailed Jul. 27, 2017", 3 pgs.

"U.S. Appl. No. 14/556,677, Final Office Action mailed Oct. 20, 2017", 8 pgs.

"U.S. Appl. No. 14/556,677, Non Final Office Action mailed Mar. 8, 2018", 8 pgs.

"U.S. Appl. No. 14/556,677, Non Final Office Action mailed May 18, 2017", 12 pgs.

"U.S. Appl. No. 14/556,677, Notice of Allowance mailed Sep. 20, 2018", 14 pgs.

"U.S. Appl. No. 14/556,677, Response filed May 30, 2018 to Non Final Office Action mailed Mar. 8, 2018", 19 pgs.

"U.S. Appl. No. 14/556,677, Response filed Jul. 21, 2017 to Non Final Office Action mailed May 18, 2017", 14 pgs.

"U.S. Appl. No. 14/556,677, Response fled Dec. 20, 2017 to Final Office Action mailed Oct. 20, 2017", 15 pgs.

"U.S. Appl. No. 14/568,187, First Action Interview—Office Action Summary mailed Mar. 13, 2017", 5 pgs.

"U.S. Appl. No. 14/568,187, First Action Interview—Pre-Interview Communication mailed Oct. 6, 2016", 4 pgs.

"U.S. Appl. No. 14/568,187, Response filed May 15, 2017 to First Office Action Interview—Interview Summary mailed Mar. 13, 2017", 11 pgs.

"U.S. Appl. No. 14/568,187, Response filed Oct. 31, 2016 to First Action Interview—Pre-Interview Communication mailed Oct. 6, 2016", 3 pgs.

"U.S. Appl. No. 14/568,251, Non Final Office Action mailed Jun. 2, 2017", 24 pgs.

(56) References Cited

OTHER PUBLICATIONS

"U.S. Appl. No. 14/569,197, Examiner Interview Summary mailed Apr. 28, 2017", 2 pgs.
"U.S. Appl. No. 14/569,197, First Action Interview—Office Action Summary mailed Jun. 1, 2017", 4 pgs.
"U.S. Appl. No. 14/569,197, First Action Interview—Pre-Interview Communication mailed Oct. 11, 2016", 4 pgs.
"U.S. Appl. No. 14/569,197, Response filed Oct. 31, 2016 to First Action Interview—Pre-Interview Communication mailed Oct. 11, 2016", 3 pgs.
"U.S. Appl. No. 14/578,414, Examiner Interview Summary mailed Jun. 7, 2017", 3 pgs.
"U.S. Appl. No. 14/578,414, Non Final Office Action mailed Mar. 9, 2017", 26 pgs.
"U.S. Appl. No. 14/578,414, Response filed May 31, 2017 to Non Final Office Action mailed Mar. 9, 2017", 17 pgs.
"U.S. Appl. No. 14/579,936, Final Office Action mailed Jul. 10, 2017", 25 pgs.
"U.S. Appl. No. 14/579,936, Non Final Office Action mailed Mar. 24, 2017", 36 pgs.
"U.S. Appl. No. 14/579,936, Response filed May 31, 2017 to Non Final Office Action mailed Mar. 24, 2017", 19 pgs.
"U.S. Appl. No. 14/580,072, Examiner Interview Summary mailed Feb. 1, 2017", 3 pgs.
"U.S. Appl. No. 14/580,072, Final Office Action mailed Jun. 16, 2017", 35 pgs.
"U.S. Appl. No. 14/580,072, First Action Interview—Office Action Summary mailed Jan. 27, 2017", 4 pgs.
"U.S. Appl. No. 14/580,072, First Action Interview—Pre-Interview Communication mailed Oct. 12, 2016", 5 pgs.
"U.S. Appl. No. 14/580,072, Response to First Action Interview mailed Jan. 27, 2017", 11 pgs.
"U.S. Appl. No. 15/182,267, Examiner Interview Summary mailed Jan. 6, 2017", 3 pgs.
"U.S. Appl. No. 15/182,267, Final Office Action mailed Mar. 8, 2017", 11 pgs.
"U.S. Appl. No. 15/182,267, Non Final Office Action mailed Sep. 12, 2016", 10 pgs.
"U.S. Appl. No. 15/182,267, Preliminary Amendment filed Jul. 14, 2016", 7 pgs.
"U.S. Appl. No. 15/182,267, Response filed Feb. 13, 2017 to Non Final Office Action mailed Sep. 12, 2016", 8 pgs.
"U.S. Appl. No. 15/182,267, Response filed Apr. 25, 2017 to Final Office Action mailed Mar. 8, 2017", 9 pgs.
"U.S. Appl. No. 16/233,908, Non Final Office Action mailed Aug. 4, 2020", 10 pgs.
"U.S. Appl. No. 16/233,908, Notice of Allowance mailed Dec. 7, 2020", 9 pgs.
"U.S. Appl. No. 16/233,908, Response filed Nov. 4, 2020 to Non Final Office Action mailed Aug. 4, 2020", 11 pgs.
"U.S. Appl. No. 17/206,931, Notice of Allowance mailed Oct. 31, 2022", 10 pgs.
"U.S. Appl. No. 17/206,931, Preliminary Amendment filed Apr. 22, 2021", 8 pgs.
"U.S. Appl. No. 18/106,810, Examiner Interview Summary mailed Dec. 12, 2023", 2 pgs.
"U.S. Appl. No. 18/106,810, Final Office Action mailed Mar. 1, 2024", 11 pgs.
"U.S. Appl. No. 18/106,810, Non Final Office Action mailed Sep. 14, 2023", 10 pgs.
"U.S. Appl. No. 18/106,810, Notice of Allowance mailed Jun. 18, 2024", 10 pgs.
"U.S. Appl. No. 18/106,810, Response filed May 22, 2024 to Final Office Action mailed Mar. 1, 2024", 12 pgs.
"U.S. Appl. No. 18/106,810, Response filed Dec. 14, 2023 to Non Final Office Action mailed Sep. 14, 2023", 12 pgs.
"U.S. Appl. No. 14/449,120, Response filed Apr. 19, 2017 to Non Final Office Action mailed on Feb. 8, 2017", 13 pgs.
"International Application Serial No. PCT/US2015/067009, International Search Report mailed Feb. 26, 2016", 2 pgs.
"International Application Serial No. PCT/US2015/067009, Written Opinion mailed Feb. 26, 2016", 6 pgs.
"International Application Serial No. PCT/US2015/067044, International Preliminary Report on Patentability mailed Jul. 6, 2017", 9 pgs.
"International Application Serial No. PCT/US2015/067044, International Search Report mailed Mar. 11, 2016", 2 pgs.
"International Application Serial No. PCT/US2015/067044, Written Opinion mailed Mar. 11, 2016", 7 pgs.
"International Application Serial No. PCT/US2015/067106, International Preliminary Report on Patentability mailed Jul. 6, 2017", 15 pgs.
"International Application Serial No. PCT/US2015/067106, International Search Report mailed Jul. 5, 2016", 3 pgs.
"International Application Serial No. PCT/US2015/067106, Written Opinion mailed Jul. 5, 2016", 13 pgs.
"International Application Serial No. PCT/US2016/024659, International Search Report mailed Jun. 10, 2016", 2 pgs.
"International Application Serial No. PCT/US2016/024659, Written Opinion mailed Jun. 10, 2016", 6 pgs.
"Placing An Image Inside of Another With Photoshop CS6", Photoshop Tutorial archived, [Online] Retrieved from the internet: https://web.archive.org/web/20140909091905/http://www.photoshopessentials.com/photo-effects/placing-an-image-insideanother-with-photoshop-cs6/, (Sep. 9, 2014), 6 pgs.
"Styku Startup Revolutionizes Apparel Shopping, Reduces Returns with Virtual Fitting Room", Microsoft Case Study: Microsoft Kinect for Windows—Styku, [Online]. Retrieved from the Internet: <URL: http://www.microsoft.com/casestudies/Microsoft-Kinect-for-Windows/Styku/Startup-Revolutionizes-Apparel-Shopping-Reduces-Returns-with-Virtual-Fitting-Roo . . . >, (Nov. 6, 2012), 7 pgs.
Andrew, Selle, et al., "Robust High-Resolution Cloth Using Parallelism, History-Based Collisions, and Accurate Friction", in IEEE Transactions on Visualization and Computer Graphics, vol. 15, No. 2, (Mar.-Apr. 2009), 339-350.
Basenese, Louis, "Virtual Fitting Rooms . . . Coming to a Store Near You", Wall Street Daily, [Online]. Retrieved from the Internet: <URL: http://www.wallstreetdaily.com/2011/07/07/virtual-fitting-rooms-fits-me/print/>, (Aug. 13, 2014), 2 pgs.
Binkley, Christina, "The Goal: a Perfect First-Time Fit: True Fit Is Online Retailers' Latest Attempt to Help Consumers Buy Right Size; No Tape Measures", Achieving a Perfect Fit in Online Shopping—WSJ, [Online]. Retrieved from the Internet: <URL: http://online.wsj.com/news/articles/SB10001424052702304724404577293593210807790#printMode>, (Mar. 23, 2012), 4 pgs.
Boonbrahm, et al., "Realistic simulation in virtual fitting room using physical properties of fabrics", Procedia Computer Science 75, (2015), 12-16.
Bossard, Lukas, et al., "Apparel classification with style", Proceedings ACCV 2012, 1-14.
Bryant, Martin, "Fits.me Launches Robot to Help Women Size Up Clothes Online", [Online]. Retrieved from the Internet: <URL: http://thenextweb.com/eu/2011/06/10/fits-me-launches-robot-to-help-women-size-up-clothes-online/>, (Jun. 10, 2011), 4 pgs.
Chang, Andrea, "Virtual Fitting Rooms Changing the Clothes Shopping Experience", Los Angeles Times, [Online]. Retrieved from the Internet: <URL: http://articles.latimes.com/print/2012/jul/13/business/la-fi-virtual-dressing-room-20120714>, (Jul. 13, 2012), 2 pgs.
Cheng, Ching-I, et al., "A 3D Virtual Show Room for Online Apparel Retail Shop", In Proceedings: APSIPA ASC 2009: Asia-Pacific Signal and Information Processing Association, 2009, Annual Summit and Conference, 193-199.
Criminisi, A, et al., "Single View Metrology", International Journal of Computer Vision, 40(2), (Jan. 1, 2000), 123-148.
Fuhrmann, Arnulph, et al., "Interaction-free dressing of virtual humans", Computers & Graphics 27, No. 1, (2003), 71-82.
Gioberto, Guido, "Garment-Integrated Wearable Sensing for Knee Joint Monitoring", ISWC '14 Adjunct, (2014), 113-118.
Gioberto, Guido, et al., "Overlock-Stitched Stretch Sensors: Characterization and Effect of Fabric Property", Journal of Textile and Apparel, Technology and Management, vol. 8, Issue 3, (Winter 2013), 14 pgs.

(56) References Cited

OTHER PUBLICATIONS

Hughes, Christopher J, et al., "Physical simulation for animation and visual effects: parallelization and characterization for chip multiprocessors", In ACM SIGARCH Computer Architecture News, vol. 35, No. 2, (2007), 220-231.
Jojic, "A framework for garment shopping over the Internet", Handbook on Electronic Commerce (2000), 249-270.
Karsch, Kevin, et al., "Rendering synthetic objects into legacy photographs", ACM Transactions on Graphics (TOG). vol. 30. No. 6. ACM, (2011), 12 pgs.
Keckeisen, Michael, et al., "Interactive cloth simulation in virtual environments", Virtual Reality, Proceedings. IEEE, (2003).
Kristensen, Kasper, et al., "Towards a Next Generation Universally Accesible 'Online Shopping-for-Apparel' System", Human-Computer Interaction, Part III, HCII 2013, LNCS 8006, (2013), 418-427.
Li, Hongqiang, et al., "Wearable Sensors in Intelligent Clothing for Measuring Human Body Temperature Based on Optical Fiber Bragg Grating", Optics Express, vol. 20 (11), [Online]. Retrieved from the Internet: <URL: htp://ro.uow.edu.au/eispapers/298>, (May 9, 2012), 11740-11752.
Lim, Sukhwan, et al., "Characterization of noise in digital photographs for image processing", In Electronic Imaging 2006, International Society for Optics and Photonics, (2006), 10 pgs.
Luo, Ze Gang, et al., "Reactive 2D/3D garment pattern design modification", Computer-Aided Design 37, No. 6, (2005), 623-630.
Miguel, Eder, et al., "Data-driven estimation of cloth simulation models", Computer Graphics Forum. vol. 31. No. 2pt2 Oxford, UK: Blackwell Publishing Ltd, (2012), 10 pgs.
Niceinteractive, "Virtual Dressing Room", YouTube, [Online]. Retrieved from the Internet: <URL: https://www.youtube.com/watch?v=UhOzN2z3wtl>, (Sep. 3, 2012), 2 minutes, 14 seconds.
O'Brien, Terrence, "Fits.me—Imitates Ladies of All Shapes and Sixes, Tries Clothes on for you (video)", [Online]. Retrieved from the Internet: <URL: http://www.engadget.com/2011/06/13/fits-me-imitates-ladies-of-all-shapes-and-sizes-tries-clothes-o/>, (Accessed Aug. 13, 2014), 10 pgs.
Okreylos, "3D Video Capture with Three Kinects", YouTube, [Online]. Retrieved from the Internet: <URL: https://www.youtube.com/watch?v=Ghgbycqb92c>, (May 13, 2014), 5 minutes, 35 seconds.
Rudolph, Larry, et al., "A Simple Load Balancing Scheme for Task Allocation in Parallel Machines", ACM, (1991), 237-245.
Satish, N, et al., "IEEE Xplore Abstact—Can traditional programming bridge the Ninja performance gap for parallel computing applications?", 39th Annual ISCA, [Online]. Retrieved from the Internet: <URL: http://ieeexplore.ieee.org/xpl/articleDetails.jsp?reload=true&arnumber=6237038>, (2012), 3 pgs.
Wu, Yingying, et al., "A Cross-Cultural Study of Consumer Perceptions of Clothing Fit", (2016).
Yang, Shan, et al., "Detailed garment recovery from a single-view image", arXiv preprint arXiv:1608.01250, (2016), 1-13.
Zhang, X, et al., "Numerical simulation of 3D dynamic garment pressure", Textile Research Journal 72.3, (2002), 245-252.

* cited by examiner

DIGITAL WARDROBE

CLAIM OF PRIORITY

This application is a Continuation of U.S. application Ser. No. 18/106,810, filed Feb. 7, 2023, which is a Continuation of U.S. application Ser. No. 17/206,931, filed Mar. 19, 2021, which is a Continuation of U.S. application Ser. No. 16/233,908, filed Dec. 27, 2018, which is a Continuation of U.S. application Ser. No. 14/556,677, filed Dec. 1, 2014, each of which is hereby incorporated by reference in its entirety.

TECHNICAL FIELD

The present application relates generally to the technical field of data processing, specifically, three-dimensional (3-D) modeling and simulation.

BACKGROUND

A customer may purchase a garment available for sale either online or in a physical store. Determining the look and fit of the garment and determining the appropriate garment size can help the customer make a better purchasing decision. Additionally, the consumer may have a wardrobe of garments that have been previously purchased by the customer. The customer can be more likely to purchase the garment available for sale when the garment available for sale matches with a garment from the customer's wardrobe of garments.

DESCRIPTION OF EMBODIMENTS

Figure 1:
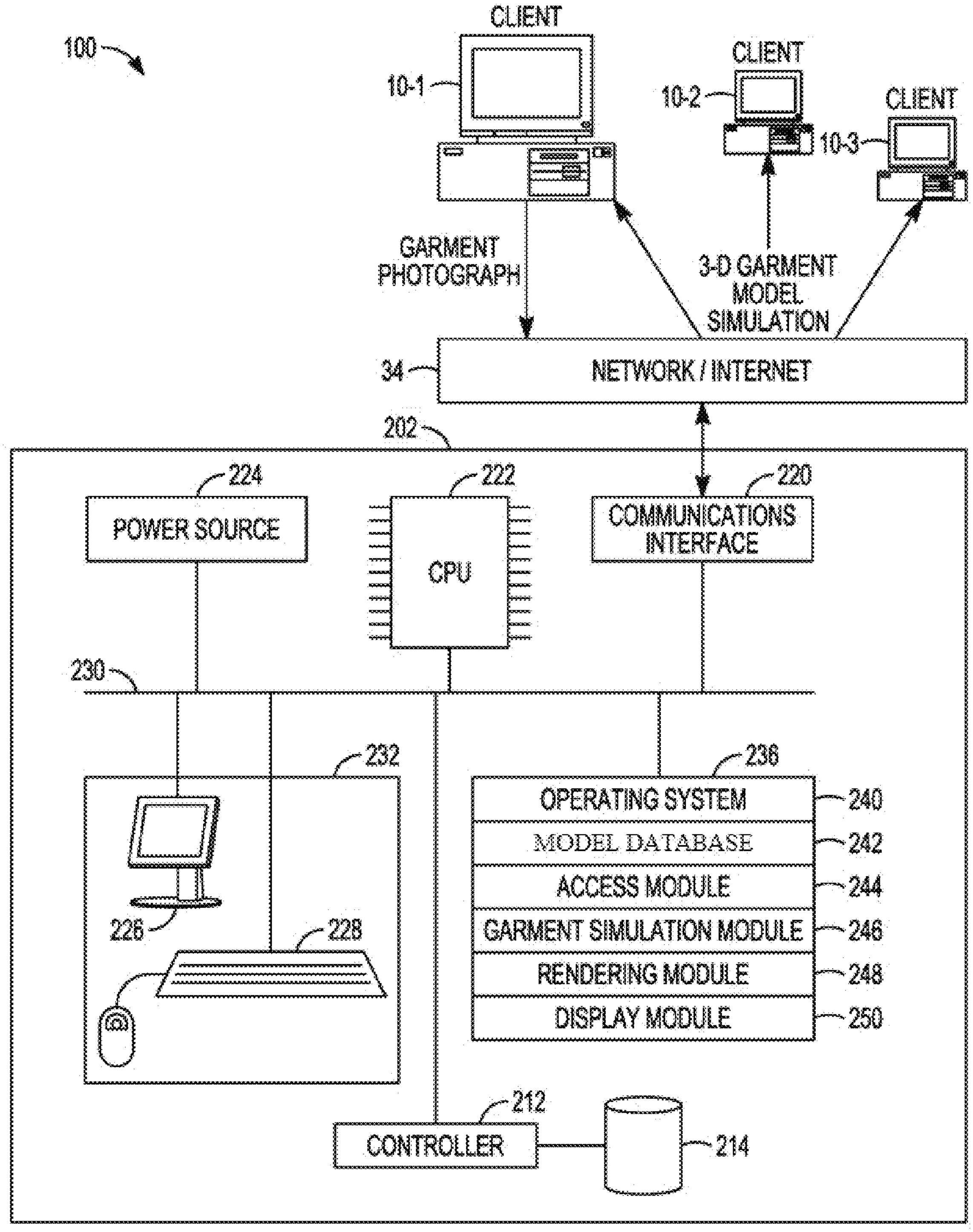
FIG. 1 is a schematic diagram illustrating an example system for generating a digital wardrobe, in accordance to certain example embodiments.

Example systems and methods for generating a digital wardrobe are described. When trying on a garment in a retail environment, it can be difficult for a customer to see how the garment matches garments in the customer's wardrobe. To address this, techniques described herein can generate a digital wardrobe. The digital wardrobe can be stored on a mobile device or a cloud server.

For example, a customer shopping in a retail environment can scan a barcode of a garment to upload the garment model in a digital database. Additionally, a body model (e.g., avatar) can be generated for the customer. By draping the garment model on the body model, a customer can visualize the look and fit of the garment model, or in conjunction with other garments and accessories picked from the retail environment.

Additionally, the digital wardrobe (e.g., wardrobe model database) can include garment models of garments owned by the customer. A user interface can be presented to a user (e.g., customer) to scroll through the different garments in the digital wardrobe. For example, a customer can scan the barcode of a pair of jeans that the customer may purchase. Continuing with the example, the user interface on the mobile device can allow the customer to scroll through different shirts owned by the customer. The customer can swipe through the different shirts to visualize how the pair of jeans and shirt would match together. Multiple garment models (e.g., a garment model for the pair of jeans and a garment model for a shirt) can be draped on the body model, and the draped model can be presented on the display of the mobile device.

Furthermore, in a gifting example, a second user can be shopping for the user with the digital wardrobe. When the second user has access to the user's body model and the digital wardrobe, the second user can be presented how a particular garment matches with other garments in the user's wardrobe.

Moreover, based on the digital wardrobe and the body model, the user interface can present a recommended size for a garment available in the retail environment. For example, the second user can scan the barcode of a garment, and the user interface can present a recommended size for the garment based on the accessed body model and digital wardrobe of the user.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident, to one skilled in the art, however, that the present subject matter may be practiced without these specific details.

Reference will now be made in detail to various example embodiments, some of which are illustrated in the accompanying drawings. In the following detailed description, numerous specific details are set forth in order to provide a thorough understanding of the present disclosure and the described embodiments. However, the present disclosure may be practiced without these specific details.

FIG. 1 is a block diagram illustrating a network environment 100 in accordance with example embodiments. The network environment 100 includes client devices (e.g., a client device 10-1, a client device 10-2, a client device 10-3) connected to a server 202 via a network 34 (e.g., the Internet). The client device 10-1 can be associated with a first user having the digital wardrobe. Additionally, the client device 10-2 can be associated with a second user that has access to the digital wardrobe and body model corresponding to the first user. Furthermore, the client device 10-3 can be associated with a third user that does not have access to the digital wardrobe and body model corresponding to the first user.

The server 202 may include one or more processing units (CPUs) 222 for executing software modules, programs, or instructions stored in a memory 236 and thereby performing processing operations; one or more communications interfaces 220; the memory 236; and one or more communication buses 230 for interconnecting these components. The communication buses 230 may include circuitry (e.g., a chipset) that interconnects and controls communications between system components. The server 202 also optionally includes a power source 224 and a controller 212 coupled to a mass storage 214. In some instances, the mass storage 214 can include a model database. The network environment 100 optionally includes a user interface 232 comprising a display device 226 and a keyboard 228.

The memory 236 may include high-speed random access memory, such as dynamic random-access memory (DRAM), static random-access memory (SRAM), double data rate random-access memory (DDR RAM), or other random-access solid state memory devices. Additionally, the memory 236 may include non-volatile memory, such as one or more magnetic disk storage devices, optical disk storage devices, flash memory devices, or other non-volatile solid state storage devices. The memory 236 may optionally include one or more storage devices remotely located from the CPU 222. The memory 236 or, alternately, the non-volatile memory device within the memory 236, may be or include a non-transitory computer-readable storage medium.

In some example embodiments, the memory 236, or the computer-readable storage medium of the memory 236, stores the following programs, modules, and data structures, or a subset thereof: an operating system 240; a model database 242; an access module 244; a garment simulation module 246; a rendering module 248; and a display module 250.

The operating system 240 is configured for handling various basic system services and for performing hardware-dependent tasks. The model database 242 can store and organize various databases utilized by various programs. The access module 244 can communicate with client devices (e.g., the client device 10-1, the client device 10-2, or the client device 10-3) via the one or more communications interfaces 220 (e.g., wired, or wireless), the network 34, other wide area networks, local area networks, metropolitan area networks, and so on. Additionally, the access module 244 can access information for the memory 236 via the one or more communication buses 230.

The model database 242 can store a digital wardrobe. The digital wardrobe can contain the garment models of the garments owned by the first user. Additionally, the model database 242 can store the body model of the first user. Furthermore, the model database 242 can store the garment database. The garment database can contain garment models of garment available for purchase in a retail environment.

The access module 244 can access information stored in the server 202 (e.g., the model database 242). Additionally, when the digital wardrobe or body model is stored in the client device 10-1, the access module 244 can access the user's information in the client device 10-1 via the network 34. For example, the access module 244 can access a first garment model from the garment database, a second garment model from the digital wardrobe, and a body model from the body model database.

The garment simulation module 246 can position the accessed body model inside the garment models. Moreover, the garment simulation module 246 can calculate simulated forces acting on garment points associated with the garment models based on the positioning of the body model inside the garment models. A fit map can be determined using the calculated simulated forces. The fit map can be presented on a mobile device to tell a user the recommended size to wear based on the determination.

The rendering module 248 can generate an image of the first garment model and second garment model draped on the body model based on the calculated simulated forces.

The display module 250 is configured to cause presentation of the generated image on a display of a device (e.g., client device 10-1). For example, the display module 250 can present a 3-D simulation on the display of mobile device. The 3-D simulation can be based on the actions of the garment simulation module 246 and the rendering module 248.

The network 34 may be any network that enables communication between or among machines, databases, and devices (e.g., the server 202 and the client device 10-1). Accordingly, the network 34 may be a wired network, a wireless network (e.g., a mobile or cellular network), or any suitable combination thereof. The network 34 may include one or more portions that constitute a private network, a public network (e.g., the Internet), or any suitable combination thereof. Accordingly, the network 34 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or a WiMAX network), or any suitable combination thereof. Any one or more portions of the network 34 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The server 202 and the client devices (e.g., the client device 10-1, the client device 10-2, and the client device 10-3) may each be implemented in a computer system, in whole or in part, as described below with respect to FIG. 9.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
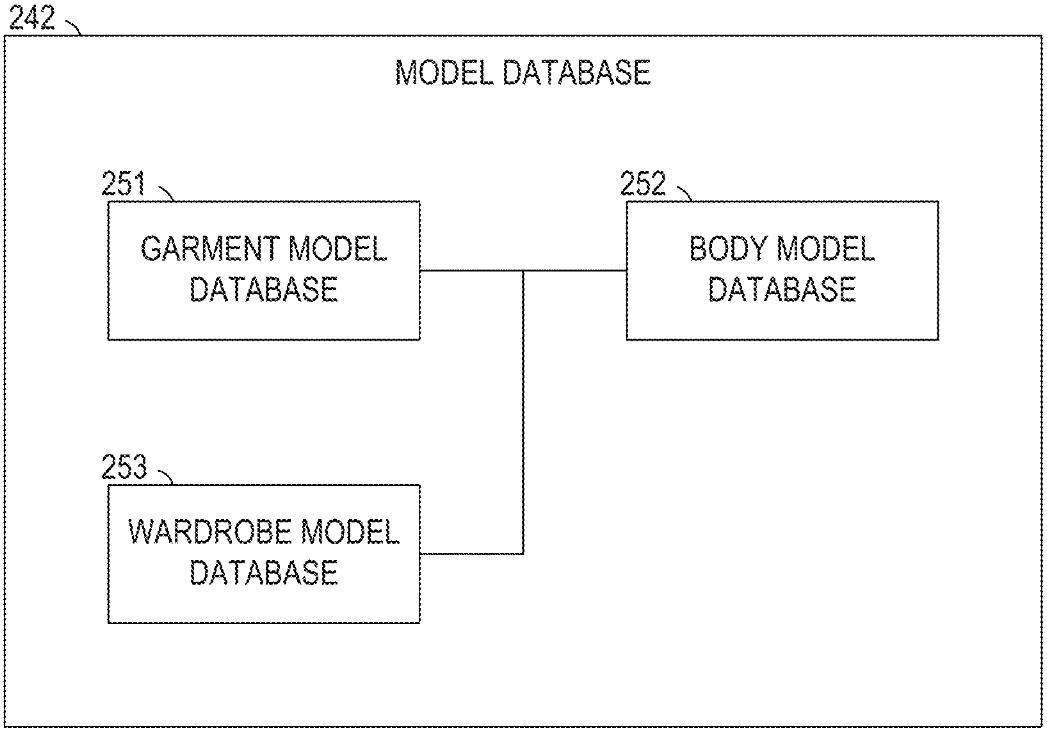
FIG. 2 is a block diagram illustrating an example model database, in accordance with certain example embodiments.
Figure 4:
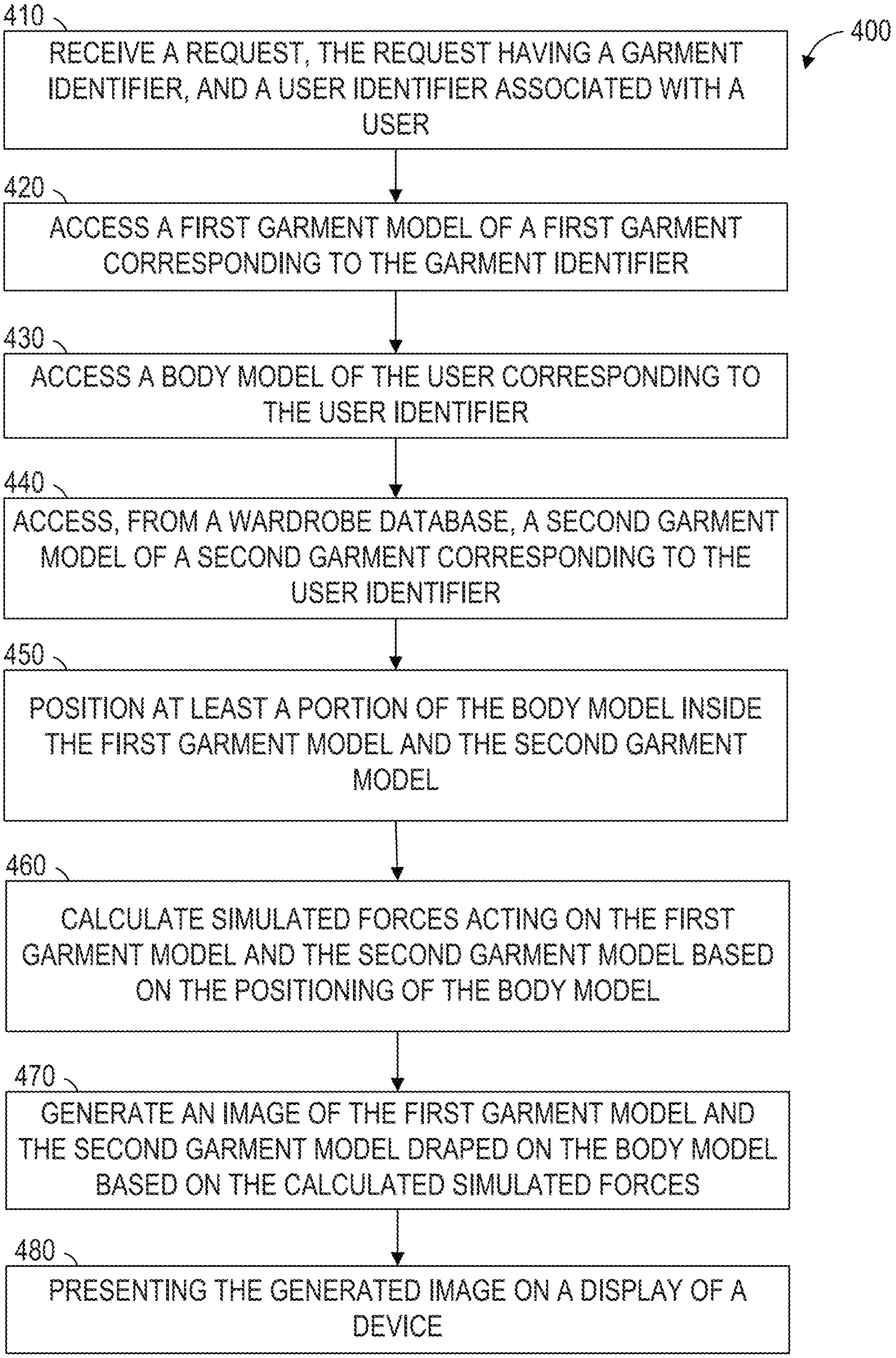
FIG. 4 is a flow diagram of a process for generating a digital wardrobe, in accordance with certain example embodiments.

FIG. 2 further describes an element of the memory 236 in the server 202, as initially described in FIG. 1. FIG. 2 includes an expanded depiction of the model database 242. The model database 242 may store one or more of the following databases: garment model database 251; body model database 252; and wardrobe model database 253. In some instances, all of the databases (e.g., the garment model database 251, body model database 252, and wardrobe model database 253) can be stored in the server 202. Alternatively, one or more of the databases (e.g., garment model database 251, body model database 252, and wardrobe model database 253) can be stored in the client device 10-1. For example, for security reasons, the body model database 252 and the wardrobe model database 253 can be stored on the client device 10-1, and only accessed by authorized users (e.g., user of client device 10-2). FIG. 4 further describes operations using the databases from FIG. 2.

Figure 3:
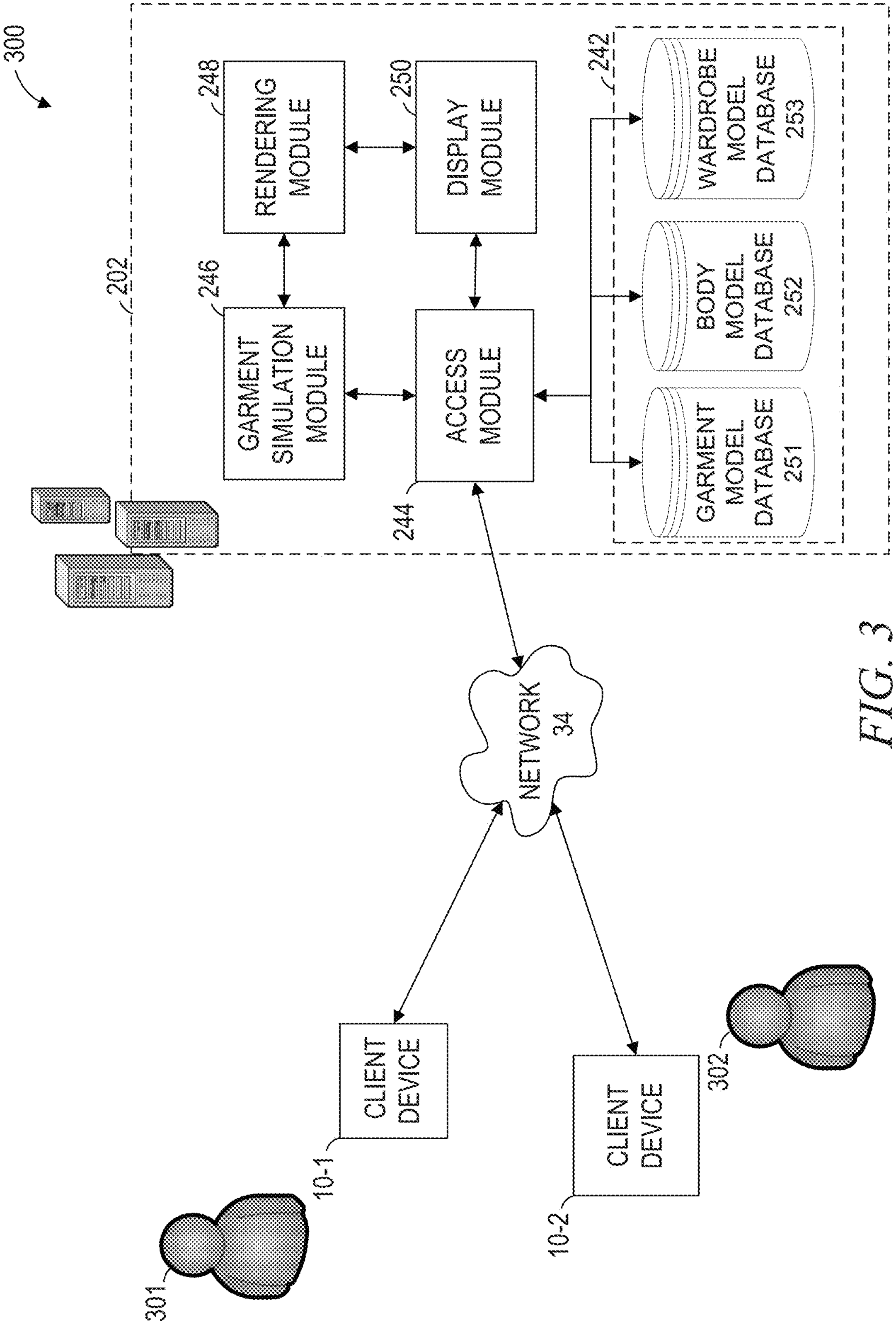
FIG. 3 is a network diagram illustrating a network environment 300 suitable for a social network, in accordance with certain example embodiments.

FIG. 3 is a network diagram illustrating a network environment 300 suitable for a social network, according to some example embodiments. The network environment 300 includes the server 202 with the garment simulation module 246 and the model database 242. The model database 242 includes the garment model database 251, the body model database 252, and the wardrobe model database 253.

The server 202 can be a cloud-based server system configured to provide one or more services to the client device 10-1 and 10-2. The server 202, the client device 10-1, and the client device 10-2 may each be implemented in a computer system, in whole or in part, as described below with respect to FIG. 5.

In some instances, a first user 301 (e.g., customer), using the client device 10-1, can send a request, to the server 202, to view how a garment available for sale matches with garments from the wardrobe of the first user 301. The request can include a user identifier and a garment identifier. For example, the garment identifier can be the barcode of a garment available for sale at a retail environment. Additionally, the user identifier can be the user credentials (e.g., username and password) or a unique identifier of the client device 10-1 (e.g., media access control (MAC) address, International Mobile Station Equipment Identity (IMEI)).

The access module 244 can retrieve a first garment model corresponding to the garment identifier from the garment model database 251. Additionally, the access module 244 can retrieve the body model corresponding to the user identifier from the body model database 252. Furthermore, the access module 244 can retrieve a second garment model from the wardrobe model database 253. The wardrobe model database 253 corresponds to the wardrobe of the first user 301 and can be accessed if the user identifier is permitted to access the wardrobe model database 253.

In some instances, the second garment model can be selected based on the first garment model. For example, if the garment available for sale is a pair of jeans, then the garment selected from the wardrobe can be a shirt to match the pair of jeans. Additionally, the second garment model can be selected based on the style (e.g., evening wear, sportswear) or brand of the garment available for sale.

In order to fulfill the user request, the garment simulation module 246, the rendering module 248, and the display module 250 can receive the first and second garment models, and the body model from the access module 244 to implement the operations described in method 400 of FIG. 4.

Alternatively, in a gifting example, a second user 302, using client device 10-2, can send a request to the server 202 to view how a garment available for sale matches with the garments from the wardrobe of the first user 301. In the gifting example, the request can also include a sender identifier associated with the second user 302. In this implementation, the body model database 252 and the wardrobe model database 253 may have an authorized list of identifiers that can access the database in each database. For example, using the authorized list of identifiers, the first user 301 can allow specific users (e.g., the second user 302) access to the body model database 252 and the wardrobe model database 253 corresponding to the user identifier for the first user 301. Therefore, the access module 244 can only access the body model and garment models associated with the user identifier, if the sender identifier is included in the authorized list of identifiers.

Also shown in FIG. 3, the first user 301 and the second user 302 may be a human user (e.g., a human being), a machine user (e.g., a computer configured by a software program to interact with the client device, or any suitable combination thereof (e.g., a human assisted by a machine or a machine supervised by a human). For example, the client device 10-1 may be a desktop computer, a vehicle computer, a tablet computer, a navigational device, a portable media device, a smartphone, or a wearable device (e.g., a smart watch or smart glasses) belonging to the user 301.

Additionally, the actual number of servers 202 used to implement the access module 244, the garment simulation module 246, the rendering module 248, and the display module 250 and how features are allocated among them will vary from one implementation to another, and may depend in part on the amount of data traffic that the network environment 300 handles during peak usage periods as well as during average usage periods.

FIG. 4 is a flowchart representing a method 400 for generating a digital wardrobe, according to example embodiments. The method 400 is governed by instructions stored in a computer-readable storage medium and that are executed by one or more processors of one or more servers 202. Each of the operations shown in FIG. 4 may correspond to instructions stored in a computer memory 236 or computer-readable storage medium.

Operations in the method 400 may be performed by the server 202, using modules described above with respect to FIGS. 1-3. As shown in FIG. 4, the method 400 includes operations 410, 420, 430, 440, 450, 460, 470 and 480. In certain example embodiments, the method 400 includes an operation for determining the size of the garment and an operation for applying a fit map to the garment.

At operation 410, the access module 244 receives a request to view how a garment matches other garments in a user's wardrobe. For example, when trying on a garment in a retail environment, a first user 301 can use a mobile device to view how the garment matches with other garments in the first user 301's wardrobe. Alternatively, in a gifting example, a second user 302 can be shopping for the first user 301, and the request to view how a garment available in a merchant store matches garments in the first user 301's wardrobe.

The request includes a garment identifier, a user identifier associated with a first user 301, and a sender identifier. In the gifting example, the sender identifier can be associated with a second user 302. When the first user 301 is sending the request, the sender identifier can be the same as the user identifier.

The request can be received from a user using the communications interface 220 via the network 34. The request can be stored in the garment model database 251.

At operation 420, the access module 244 accesses a first garment model of a first garment corresponding to the garment identifier. The first garment can be a garment available for sale at a merchant. The garment model is stored in a garment model database 251. In some instance, the garment model is uploaded to the garment model database 251 by a merchant or manufacturer. Additionally, the garment model can be generated by the garment simulation module 246 using images of the garment. The first garment model can be received from a database (e.g., model database 242) using the communications interface 220 via the network 34.

In some instances, the garment model of a garment can be a three-dimensional garment model that includes garment points that represent a surface of the garment. For example, the garment model can be a tessellated three-dimensional garment model. The tessellated three-dimensional garment model can includes a group of vertices associated with points on the surface of the garment.

The garment points can be generated using a tessellation technique. Tessellation can tile a garment into many tessellated geometric shapes to generate the tessellated garment with garment points. For example, a shirt can be tessellated with triangles (e.g., about 20,000 triangles when a triangle edge is around 1 centimeter), and the vertices of the triangles can be the garment points of the three-dimensional garment model. The garment points can include location information such as an x, y, and z position value.

Additionally, the garment model can have one or more model features. Model features refer to characteristics or attributes that are distinctive to the specific garment. For example, when the garment is a pair of jeans, the features can include a waistband, a high rise (e.g., 3" down from top of waistband), a low hip (e.g., 6" down from top of waistband), a thigh measurement (e.g., circumference), a knee measurement, an inseam length, a fit (e.g., slim, normal, loose), and a cut (boot cut, relaxed, skinny, taper, straight). The list of model features is just representative, and is not intended to be exhaustive. The model features can be used to select a second garment model at operation 440 to match the first garment model.

Furthermore, the first garment can be available for sale in a merchant store. Additionally, the garment identifier received in operation 410 can be obtained by scanning a garment tag (e.g., barcode) of the first garment. The garment tag can be scanned by the user having the garment wardrobe stored on a cloud server or on the user's device. Alternatively, in the gifting example, the garment tag can be scanned by a second user 302 looking to purchase the garment for the user having the garment wardrobe. In the gifting example, the garment wardrobe can be stored on a cloud server.

In the gifting example, as previously described, the request can further include a sender identifier associated with a second user 302. The body model and the second garment model are accessed at operations 430 and 440, if the sender identifier is included in an approved list associated with the user identifier. Additionally, the approved list can include approved identifiers that are authorized by the user to access information associated with the user identifier.

At operation 430, the access module 244 accesses a body model of the user corresponding to the user identifier. For example, the body measurement can include neck size, arm length, chest size, waist size, leg length, and so on. The body model can be received from a database (e.g., mass storage 214) using the communications interface 220 via the network 34. The body model can be stored in the body model database 252. In some instances, the body model can be stored on a cloud server for the user to retrieve using a mobile device. In some other instances, the body model can be stored on a third-party server of a merchant that a user can access when browsing a virtual fitting room.

The body model can be generated using multiple body measurements. The body measurement of the person can be received via user input or stored in the body model database 252. For example, the list of body measurements for a man can include weight, height, chest, waist, and inseam. The list of body measurements for a woman can include weight, height, bust, waist, and hips. The garment simulation module 246 can generate an avatar for the user based on the measurements. Additionally, different bodies can also be created by interpolating between two bodies of specific measurements. Furthermore, the body model can also be generated by three-dimensional scanning of the body. The list of parameters is just representative, and is not intended to be exhaustive.

In some instances, the body model database 252 includes a table that associates body models with corresponding user identifiers. In some instances, the user identifier can be a global identifier tagged to the user. The body model of the user can be generated by the garment simulation module 246 using images of the user or user dimensions. The user can upload the images of the user or user dimensions using the communications interface 220 via the network 34.

Additionally, the body model, including the body measurements, can be derived from favorite garment pictures or measurements or information like brand and size. Moreover, body information can come in the form of past purchases and feedback (e.g., right size, loose, tight, good fit, and right style).

In operation 440, the access module 244 accesses a second garment model of a second garment corresponding to the user identifier. The second garment model can be accessed from a wardrobe database 253. In some instances, the second garment model can be selected based on the style of the first garment model.

The wardrobe database 253 can have garment models of garments in a wardrobe of the user. The garment model of a garment purchased by the user is automatically uploaded to the wardrobe database 253. The wardrobe database 253 can be stored on cloud-based servers. For example, any user that is authorized to access information corresponding to the user identifier can access the information from the cloud-based server via the internet 34. Alternatively, the wardrobe model database 253 can be stored on a mobile device (e.g., client device 10-1).

In some instances, the wardrobe model database 253 stores the garment models of garments owned by the user. The garments owned by the user can be stored in the user's wardrobe. The user can upload the garment to the wardrobe model database 253 by uploading photos of the garments draped on the user. Alternatively, the user can scan the garment tag to upload the garment to the wardrobe model database 253. Additionally, the garment can automatically be uploaded to the wardrobe model database 253 when the user purchases a garment from a merchant or online. For example, when the user logs into the user's account with an online merchant, and purchases a garment, the online merchant can transmit the garment identifier and the user identifier to the wardrobe database 253. The wardrobe database 253 can have a table associating a specific user identifier with the garment identifiers corresponding to the garments owned by the user.

At operation 450, the garment simulation module 246 positions at least a portion of the body model inside the first garment model and the second garment model. In some instances, positioning can include placing the garment on or around the body, given that the body may be fixed, in some embodiments. In these instances, the garment can be stretched and deformed based on the simulation. The garment simulation module 246 can configure at least one processor among the one or more processors (e.g., the CPU 222) to position the body model inside the garment model.

The garment simulation module 246 simulates the garment model on a generated user avatar. In some instances, simulation of the garment can include placing the garment around the body at an appropriate position, and running simulations. The simulation can advance the position and other related variables of the vertices of the garment based on different criteria (e.g., the laws of physics, garment material properties, body-garment interaction). The result is a large system of equations (e.g., one variable for each force component) that the garment simulation module 246 can solve in an iterative fashion. The simulation can be completed when the simulation becomes stable. For example, the simulation can become stable when the garment reaches a steady state with a net force of zero.

At operation 460, the garment simulation module 246 can calculate simulated forces acting on the first garment model and the second garment model based on the positioning of the body model inside the first garment model and the second garment model. The garment simulation module 246 can configure at least one processor among the one or more processors (e.g., the CPU 222) to calculate the simulated force.

By simulating the garment model on a body model, the garment simulation module 246 can simulate a fashion experience. In some instances, simulation of the garment can include placing the garment around the body at an appropriate position, and running simulations based on calculations described at operation 450. The simulation can advance the position and other related variables of the vertices of the garment based on different criteria (e.g., the laws of physics, garment material properties, body-garment interaction). The result is a large system of equations (e.g., one variable for each force component) that the garment simulation module 246 can solve in an iterative fashion. The simulation can be completed when the simulation becomes stable. For example, the simulation can become stable when the garment reaches a steady state with a net force of zero.

In some arrangements, the simulated force can include a gravitational force, an elastic force, a friction force, or an aerodynamic force. Additionally, the garment simulation module 246 can further calculate the simulated forces acting on the subset of the garment points based on the material property of the garment. For example, the simulated forces can include a gravitational force and an elastic force, and the material property of the garment indicates a degree to which the garment is elastic. The material property of the garment can include, but is not limited to, a sheerness value, a linear stiffness value, or a bending stiffness value.

Figure 5:
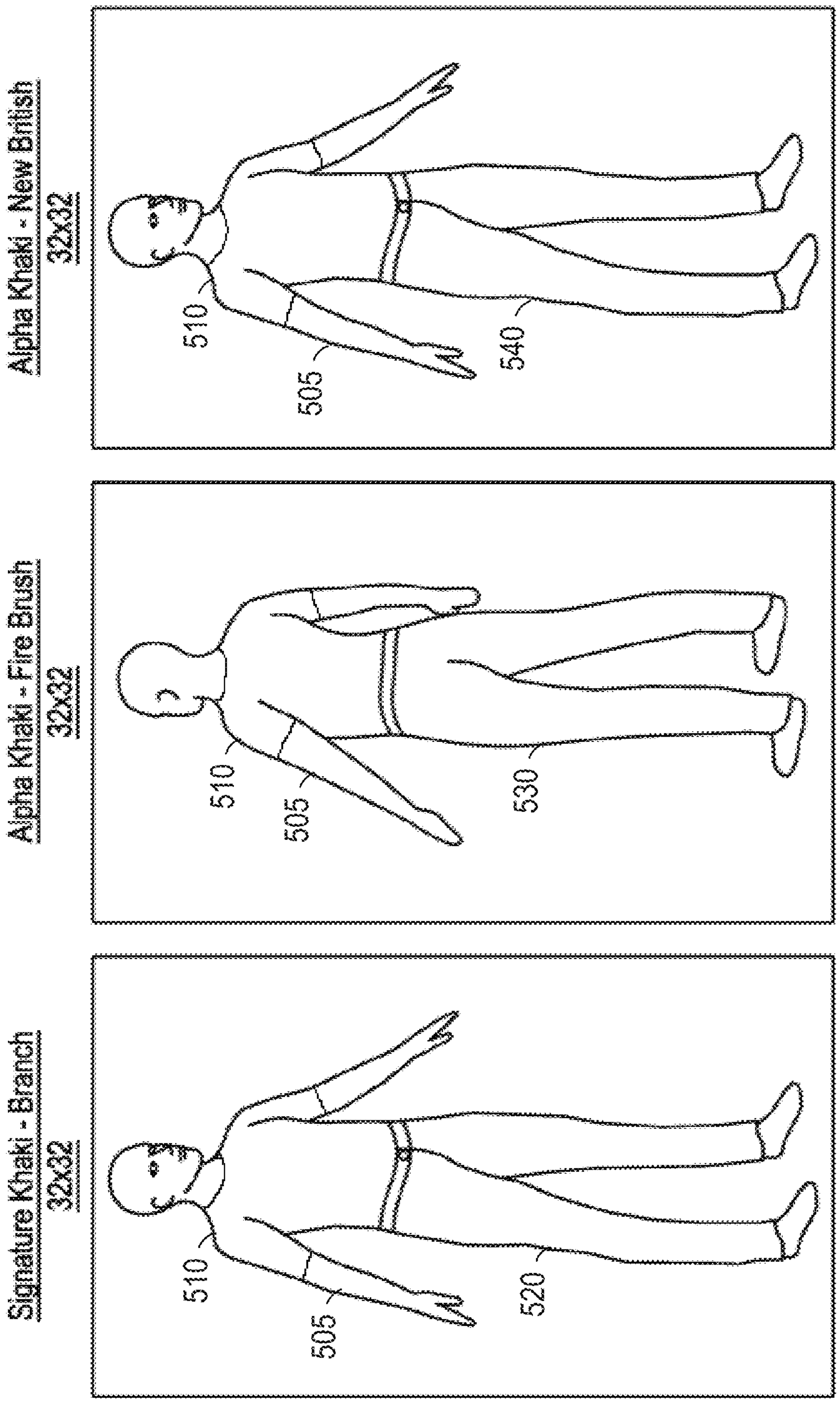
FIG. 5 is a user interface diagram showing a user interface selecting different garments from the digital wardrobe, in accordance with certain example embodiments.

At operation 470, the rendering module 248 can generate an image of the first garment model 510 (e.g., shirt for sale) and the second garment model 520 (e.g., pair of khakis in the digital wardrobe) draped on the body model 505 based on the calculated simulated forces, as illustrated in FIG. 5. The rendering module 248 can configure at least one processor among the one or more processors (e.g., the CPU 222) to generate the image at operation 470.

In some instances, the rendering module 248 can generate an image of the first garment model 510 and second garment model 520 draped on the body model 505. The garment model can be presented based on a simulated force. For example, the presentation can be done by digitally draping a first and a second tessellated 3-D garment models onto a 3-D body model. In various example embodiments, operations 460 and 470 involve taking data from all previous operations, combining them, and inputting them into a cloth simulation engine.

At operation 480, the display module 250 can present the generated image on a display of a device. The display module 250 can configure the user interface 232 for the presentation. The display module 250 can configure at least one processor among the one or more processors (e.g., the CPU 222) to present the generated image on the display of a mobile device.

As illustrated in FIG. 5, the method 400 can further include a user input to view the different garments in the wardrobe database 253 along with the first garment model 510. In some instances, a user interface 232 on the mobile device can receive a user input (e.g., swipe left, swipe right, voice input, hand motion) to scroll through the different garments in the wardrobe model database 253. For example, a user input on the user interface 232 can result in a third garment model 530 (e.g., second pair of khaki in the digital wardrobe) and the first garment model 510 (e.g., shirt for sale) being draped on the body model 505.

In response to the user input, the access module 244 can access from the wardrobe database 253 a third garment model 530. Then, the garment simulation module 246 can position at least a portion of the body model 505 inside the first garment model 510 and the third garment model 530, and can calculate new simulated forces acting on the first garment model 510 and the third garment model 530 based on the positioning of the body model 505 inside the first garment model 510 and the third garment model 530. Subsequently, the rendering module 248 can generate a second image of the first garment model 510 and the third garment model 530 draped on the body model 505 based on the calculated new simulated forces. Moreover, the display module 250 can present the generated second image on the display of the device.

Additionally, another user input can result in a fourth garment model 540 (e.g., third pair of khakis in the digital wardrobe) and the first garment model 510 (e.g., shirt for sale) being draped on the body model 505. As shown in this example, the garment simulation module 246 determined a specific type of bottoms (e.g., khakis) match better with the shirt available for sale.

Figure 6:
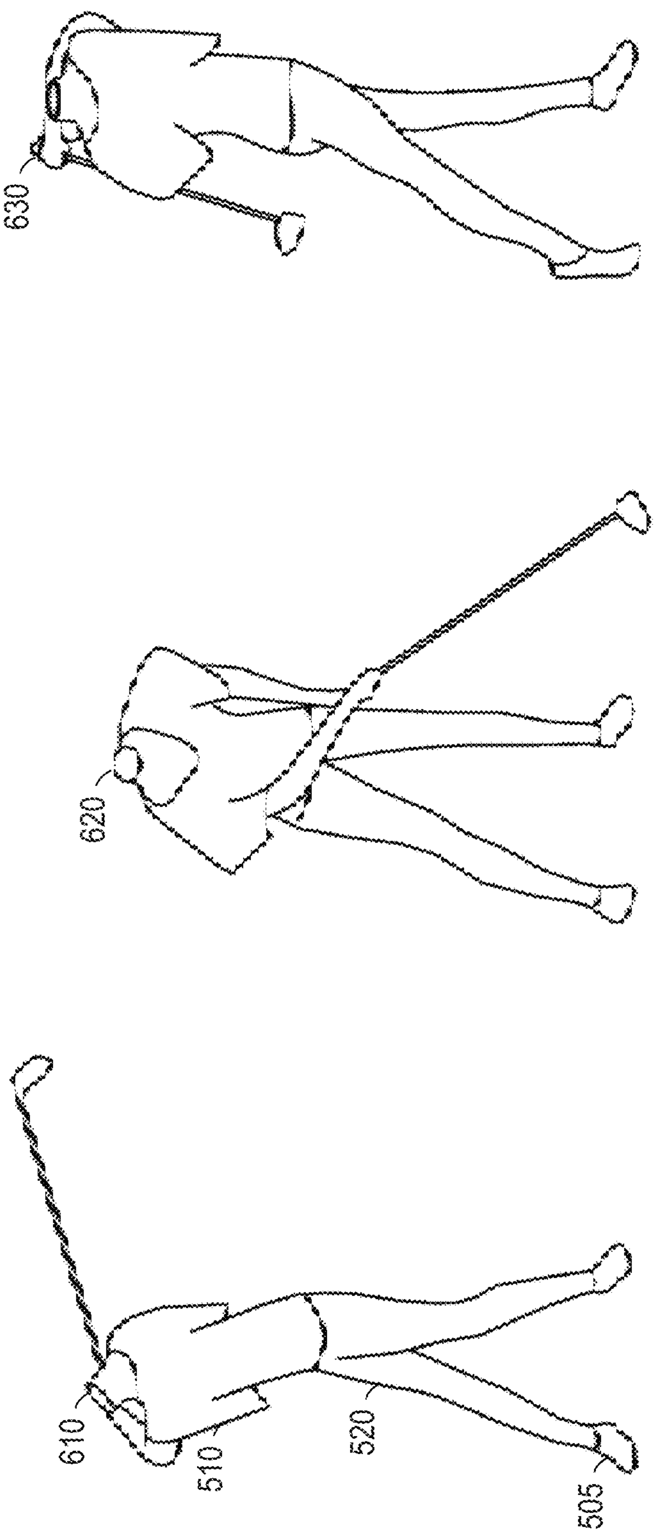
FIG. 6 illustrates a body model having a first position, a second position, and a third position, in accordance with certain example embodiments.

As illustrated in FIG. 6, the method 400 can further include operations where the garment simulation module 246 is configured to change the model position from a first body position 610 to a second body position 620. Additionally, the garment simulation module 246 can reposition at least a portion of the body model 505 inside the first garment model 510 and the second garment model 520 based on the changing of the body model 505 to the second body position 620, and calculate updated simulated forces acting on acting on the first garment model 510 and the second garment model 520 based on the repositioning. A similar process can also occur when the body model 505 changes from the second body position 620 to a third body position 630.

Figure 7:
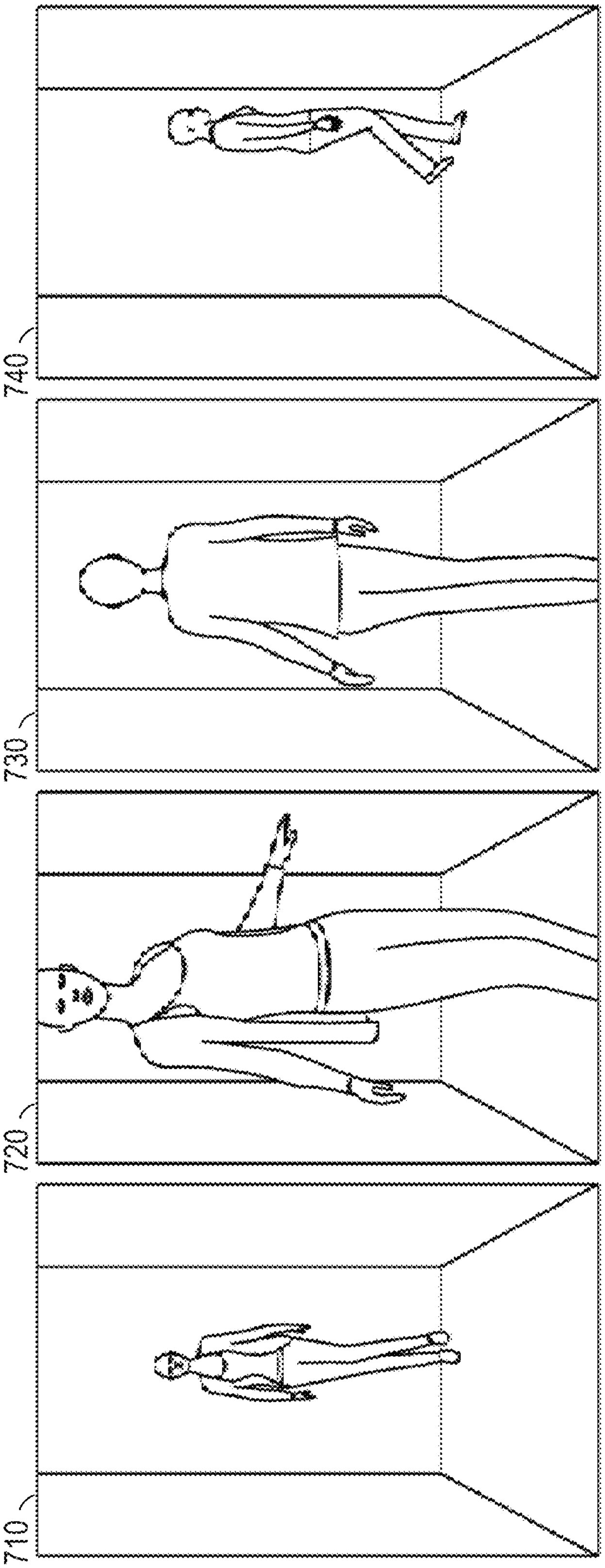
FIG. 7 illustrates an example digital content animation, in accordance with certain example embodiments.

As the body model 630 is animated from a first body position 610 to a second body position 620, the animation can be stored as a series of images (e.g., first image 710, second image 720, third image 730, and fourth image 740) as illustrated in FIG. 7. Both the resolution and number of images can be set dynamically. Additionally, the animation can include other use cases, such as videos, 3-D objects, or text description of the simulation output.

Figure 8:
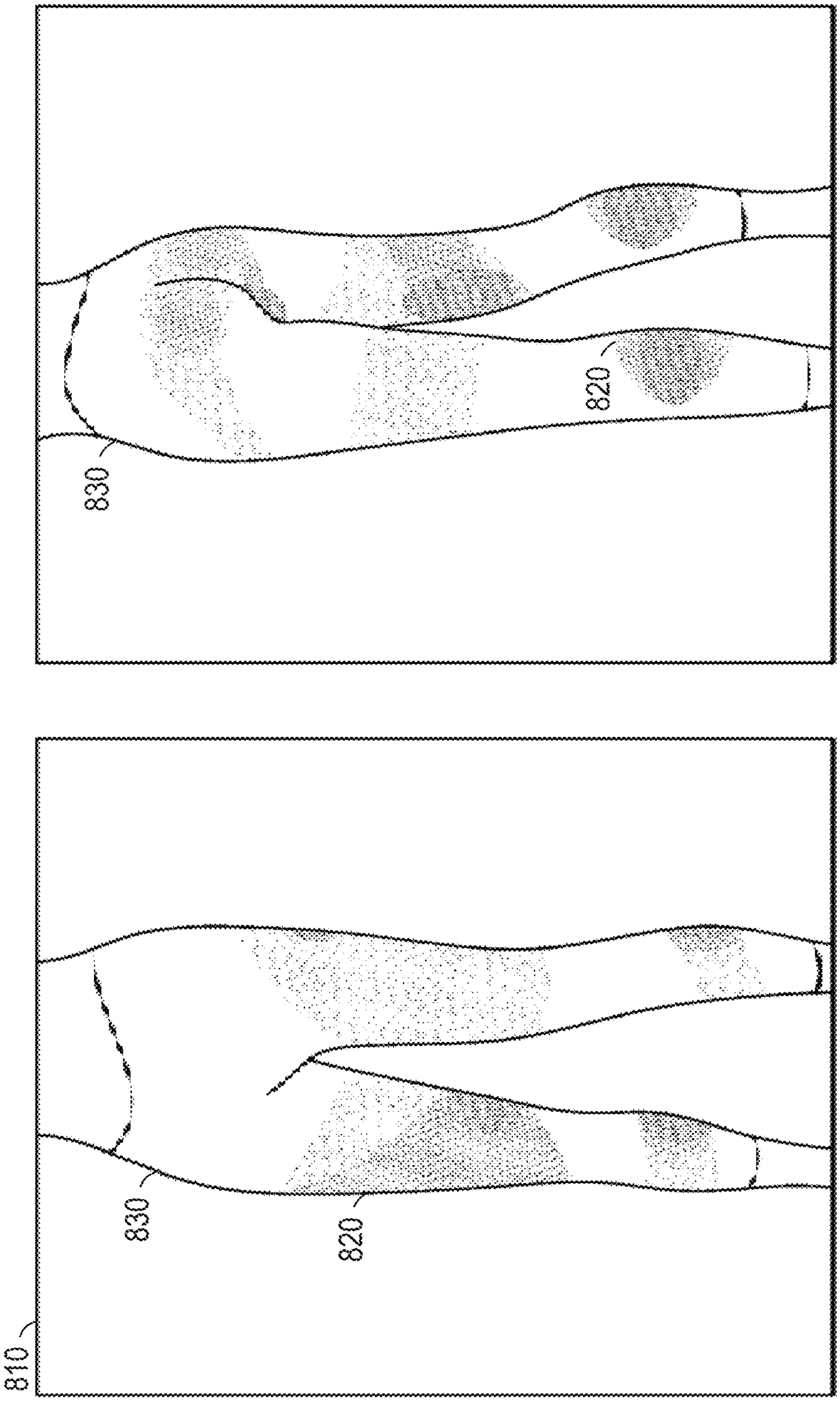
FIG. 8 illustrates an example of a fit map, in accordance with certain example embodiments.

As illustrated in FIG. 8, the method 400 can further include operations where the garment simulation module 246 is configured to generate a fit map 810 based on the calculated simulated forces, and the display module 250 can present the generated image at operation 470 with a generated fit map 810. The fit map 810 can illustrate tension forces, inferred force, or pressure on the body. The fit map 810 can show and convey regions of the garment that can be tight or loose on a user. This additional information can aid the user in making an informed purchase decision without physically trying on the garment.

Moreover, loose or tight clothing may convey some style information. For example, when the magnitude of the calculated simulated forces is high, the fit map 810 can label that section of the garment as a tight section 820. Alternatively, a loose section 830 occurs when the magnitude of the calculated simulated forces is low. Furthermore, the fit map 810 can convey derivative information such as the relative differences in force, style, and fit between two garments. For example, a user can use the derivative information from the fit map 810 to select between the two sizes or styles. Optionally, texture and optical properties can be determined from the information accessed at operation 420 and 440. The texture information can be used to determine the material properties of the garment and can be used to generate the fit map 810. The material properties of the garment can be used for calculating the simulated forces on the garment model at operation 450.

In various example embodiments, the garment simulation module 246 can determine a size from a set of sizes for the first garment model 510 based on the calculated simulated forces. In some instances, the determination of the size of the first garment model 510 can be based on the generated fit map 810. For example, tops are usually distributed in a few generic sizes (e.g., XS, S, M, L, XL, XXL). By computing the tension map for each size for the user's avatar, a recommended size can be suggested by the garment simulation module 246. The recommended size can be based on the size that fits the dimensions of the body model 505 the closest with minimum distortion to the garment, or the recommendation could be based on the garment fit guidance from a manufacturer, designer or stylist.

In addition to suggesting a recommended size, techniques for incorporating a user's fitting preferences (e.g., loose around the waist) are also described. Algorithms to compute a personalized size recommendation for the first user 301 can further be developed based on a user's buying and return pattern. In some instances, the personalized size recommendation can be based on dividing the body into zones and having a list of acceptable sizes for each zone. Furthermore, fit and size recommendation can be based on specific information about the class or type of garment. For example, given that yoga pants have a tight fit, when the class of garment is determined to be yoga pants, the garment simulation module 246 can infer that the garment has a tight fit based on parameters obtained from the manufacturer or a lookup table.

In various example embodiments, from the body dimensions determined by the body model 505, the garment simulation module 246 can classify the body of the first user 301 into categories such as body type (e.g., athletic, pear, triangle, or hourglass) or height class (e.g., tall, average, petite) or similar such categories. Such a classification or combinations of classifications could be saved in the model database 242 or associated with other users (e.g., second user 320) with similar body dimensions. These classifications could be used for style recommendations for presenting the second garment model 520 from the wardrobe model database 253, when the first user 301 has selected a garment from a retail environment (e.g., first garment model 510 from the garment model database 251).

Alternatively, based on the information in the wardrobe model database 253, garment recommendations can be sent to the first user 301. For example, the first user 301 can receive personalized email marketing, advertisements, search results or recommendations (e.g., what cut of jeans looks best) based on the garments in the wardrobe of the first user 301. Additionally, the size recommendations can be based on the style of the garments. For example, the garment simulation module 246 can determine the recommended inseam length for a specific rise length.

Additionally, the body can be divided into zones. For a woman, the zones can include shoulders, bust, waist, hips, thighs, calves, and so on. For a given size of a garment of a certain category (e.g., jeans), the technique can determine if the garment fits based on the user's buying and return pattern, which can be stored in the wardrobe model database 253. When the garment fits, the dimensions of the garment in each applicable zone can be added to a list of acceptable dimensions for the user. When the garment fits, the algorithm used by the garment simulation module 246 may assume that all the dimensions fit the user. Alternatively, when the garment does not fit (e.g., the user returns the garment), the dimensions of the garment in each applicable zone are added to a list of unacceptable dimensions, stored in a wardrobe model database 253. Similarly, when the garment does not fit, the algorithm may assume that at least one of the dimensions did not fit the user.

A classifier (e.g., sequential minimization optimization (SMO)) for each garment category is implemented by the garment simulation module 246 based on the dimensions that either fit or do not fit the user. For a given new garment in a specific category, the garment simulation module 246 can predict the correct size based on the classifier and recommend the size to the user. Based on feedback (e.g., the user's buying and return pattern), the user's preference and the classifiers can be updated by the garment simulation module 246. In some instances, five to ten garments in a wardrobe model database 253 for a given category can help achieve over 90% accuracy on the correct user size. Accordingly, the number of garments to train and converge on user's preferences can be low (e.g., less than 10).

When these effects are considered in aggregate, one or more of the methodologies described herein may obviate a need for certain efforts or resources that otherwise would be involved in generating a digital wardrobe, garment models draped on a body model 505, a fit map 810, and a recommendation of garment size. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 9:
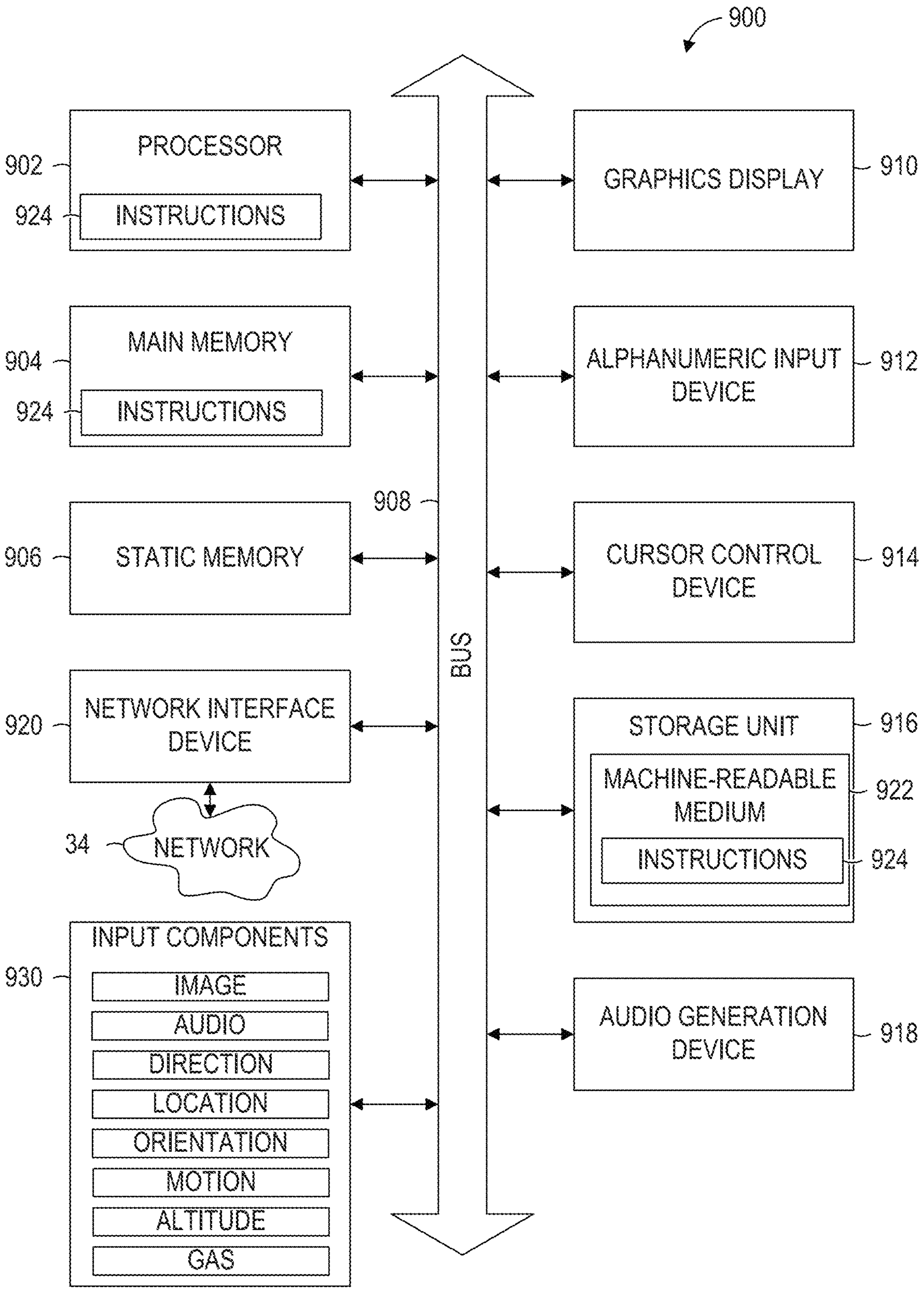
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part. The server 202 can be an example of the machine 900.

In alternative embodiments, the machine 900 operates as a standalone device or may be connected (e.g., networked)

to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media 922 (e.g., tangible and non-transitory machine-readable media). The instructions 924 may be transmitted or received over the network 34 via the network interface device 920. For example, the network interface device 920 may communicate the instructions 924 using any one or more transfer protocols (e.g., hypertext transfer protocol (HTTP)).

The machine-readable medium 922 may include a magnetic or optical disk storage device, solid state storage devices such as flash memory, or other non-volatile memory device or devices. The computer-readable instructions 924 stored on the computer-readable storage medium 922 are in source code, assembly language code, object code, or another instruction format that is interpreted by one or more processors 902.

In some example embodiments, the machine 900 may be a portable computing device, such as a smartphone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 922 able to store data temporarily or permanently and may be taken to include, but not be limited to, random-access memory (RAM), read-only memory (ROM), buffer memory, flash memory, and cache memory. While the machine-readable medium 922 is shown, in an example embodiment, to be a single medium, the term "machine-readable medium" should be taken to include a single medium or multiple media (e.g., a centralized or distributed database, or associated caches and servers 202) able to store the instructions 924. The term "machine-readable medium" shall also be taken to include any medium, or combination of multiple media, that is capable of storing the instructions 924 for execution by the machine 900, such that the instructions 924, when executed by one or more processors 902 of the machine 900 (e.g., the processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and the operations can be performed in a different order than illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 922 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 902 or other programmable processor 902. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 902 configured by software to become a special-purpose processor, the general-purpose processor 902 may be configured as respectively different special-purpose processors (e.g., comprising different hardware modules) at different times. Software (e.g., a software module) may accordingly configure one or more processors 902, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module implemented using one or more processors 902.

Similarly, the methods described herein may be at least partially processor-implemented, a processor 902 being an example of hardware. For example, at least some of the operations of a method may be performed by one or more processors 902 or processor-implemented modules. As used herein, "processor-implemented module" refers to a hardware module in which the hardware includes one or more processors 902. Moreover, the one or more processors 902 may also operate to support performance of the relevant operations in a "cloud computing" environment or as a "software as a service" (SaaS). For example, at least some of the operations may be performed by a group of computers (as examples of machines including processors 902), with these operations being accessible via a network 34 (e.g., the Internet) and via one or more appropriate interfaces (e.g., an application program interface (API)).

The performance of certain operations may be distributed among the one or more processors 902, not only residing within a single machine, but deployed across a number of machines. In some example embodiments, the one or more processors 902 or processor-implemented modules may be located in a single geographic location (e.g., within a home environment, an office environment, or a server farm). In other example embodiments, the one or more processors 902 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the arts. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

receiving, from a device via a computer network, a request comprising a garment identifier and a user identifier associated with a user;

accessing, from a garment model database, a garment model of a garment corresponding to the garment identifier;

accessing, from a body model database, a body model of the user corresponding to the user identifier;

configuring, by a garment simulation module, at least one processor to position at least a portion of the body model inside the garment model corresponding to the garment identifier;

configuring, by the garment simulation module, at least one processor to determine simulated forces acting on the garment model based on the positioning of the body model for two different sizes of the garment;

based on the simulated forces for the two different sizes, generating a fit map that conveys at least one derivative component associated with the two different sizes;

based on the fit map, determining a recommended size; and causing presentation of the recommended size on a display of the device.

2. The method of claim 1, further comprising:

causing presentation of the fit map conveying the at least one derivative component on the display of the device.

3. The method of claim 1, wherein the determining the recommended size further comprises incorporating fitting preferences of the user.

4. The method of claim 1, wherein the determining the recommended size is further based on a class or type of the garment.

5. The method of claim 1, wherein the at least one derivative component comprises a relative difference in force or fit between the two different sizes.

6. The method of claim 1, wherein the recommended size is based on a size that fits dimensions of the body model the closest with minimum distortion to the garment.

7. The method of claim 1, wherein the garment model is a tessellated three-dimensional garment model.

8. The method of claim 1, wherein the body model has a first body position, the method further comprising:

altering the body model to a second body position;

repositioning the body model inside the garment model based on the altering of the body model to the second body position; and determining one or more updated simulated forces acting on the garment model based on the repositioning.

9. The method of claim 1, wherein the garment model of the garment is automatically uploaded to a wardrobe model database in response to a purchase of the garment.

10. The method of claim 1, wherein the receiving the request comprises receiving a scan of a code associated with the garment.

11. The method of claim 1, further comprising generating an avatar for the user, the avatar being the body model.

12. A system comprising:

one or more processors; and a memory storing instructions that, when executed by the system, causes the system to perform operations comprising:

receiving, from a device via a computer network, a request comprising a garment identifier and a user identifier associated with a user;

accessing, from a garment model database, a garment model of a garment corresponding to the garment identifier;

accessing, from a body model database, a body model of the user corresponding to the user identifier;

configuring, by a garment simulation module, at least one of the one or more processors to position at least a portion of the body model inside the garment model corresponding to the garment identifier;

configuring, by the garment simulation module, at least one of the one or more processors to determine simulated forces acting on the garment model based on the positioning of the body model for two different sizes of the garment;

based on the simulated forces for the two different sizes, generating a fit map that conveys at least one derivative component associated with the two different sizes;

based on the fit map, determining a recommended size; and causing presentation of the recommended size on a display of the device.

13. The system of claim 12, wherein the operations further comprise:

causing presentation of the fit map conveying the at least one derivative component on the display of the device.

14. The system of claim 12, wherein the determining the recommended size further comprises incorporating fitting preferences of the user.

15. The system of claim 12, wherein the determining the recommended size is further based on a class or type of the garment.

16. The system of claim 12, wherein the at least one derivative component comprises a relative difference in force or fit between the two different sizes.

17. The system of claim 12, wherein the recommended size is based on a size that fits dimensions of the body model the closest with minimum distortion to the garment.

18. The system of claim 12, wherein the garment model is a tessellated three-dimensional garment model.

19. A non-transitory machine-storage medium comprising instructions that, when executed by a machine, cause the machine to perform operations comprising:

receiving, from a device via a computer network, a request comprising a garment identifier and a user identifier associated with a user;

accessing, from a garment model database, a garment model of a garment corresponding to the garment identifier;

accessing, from a body model database, a body model of the user corresponding to the user identifier;

configuring, by a garment simulation module, one or more processors to position at least a portion of the body model inside the garment model corresponding to the garment identifier;

configuring, by the garment simulation module, one or more processors to determine simulated forces acting on the garment model based on the positioning of the body model for two different sizes of the garment;

based on the simulated forces for the two different sizes, generating a fit map that conveys at least one derivative component associated with the two different sizes;

based on the fit map, determining a recommended size; and causing presentation of the recommended size on a display of the device.

20. The machine-storage medium of claim 19, wherein the at least one derivative component comprises a relative difference in force or fit between the two different sizes.

* * * * *